United States Patent
Krajewski et al.

(10) Patent No.: US 9,303,671 B2
(45) Date of Patent: Apr. 5, 2016

(54) METHOD OF ISOLATING METALLIC FASTENERS IN COMPOSITE PANELS

(71) Applicant: GM GLOBAL TECHNOLOGY OPERATIONS LLC, Detroit, MI (US)

(72) Inventors: Paul E. Krajewski, Troy, MI (US); Joseph M. Polewarczyk, Rochester Hills, MI (US); Jeffrey L. Konchan, Romeo, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 482 days.

(21) Appl. No.: 13/741,420

(22) Filed: Jan. 15, 2013

(65) Prior Publication Data

US 2014/0196272 A1    Jul. 17, 2014

(51) Int. Cl.

| | |
|---|---|
| *F16B 19/08* | (2006.01) |
| *F16B 19/04* | (2006.01) |
| *B21J 15/02* | (2006.01) |
| *B21J 15/04* | (2006.01) |
| *B21J 15/14* | (2006.01) |
| *B29C 65/56* | (2006.01) |
| *B29C 65/60* | (2006.01) |
| *B29C 65/00* | (2006.01) |
| *B29L 31/30* | (2006.01) |
| *F16B 5/04* | (2006.01) |

(52) U.S. Cl.
CPC ............... *F16B 19/04* (2013.01); *B21J 15/02* (2013.01); *B21J 15/04* (2013.01); *B21J 15/147* (2013.01); *B29C 65/562* (2013.01); *B29C 65/602* (2013.01); *B29C 66/1122* (2013.01); *B29C 66/21* (2013.01); *B29C 66/41* (2013.01); *B29C 66/7212* (2013.01); *B29C 66/73141* (2013.01); *B29L 2031/3055* (2013.01); *F16B 5/04* (2013.01); *Y10T 29/49956* (2015.01)

(58) Field of Classification Search
CPC ............ F16B 19/04; F16B 5/04; B21J 15/04; B21J 15/147; B21J 15/02; B29C 66/73141; B29C 66/41; B29C 66/21; B29C 65/602; B29C 66/7212; B29C 65/562; Y10T 29/49956
See application file for complete search history.

(56) References Cited

U.S. PATENT DOCUMENTS

| | | | | |
|---|---|---|---|---|
| 4,949,450 | A | * | 8/1990 | Scharres ........................ 29/523 |
| 6,607,328 | B1 | * | 8/2003 | Treiber et al. ............. 403/408.1 |
| 2009/0304438 | A1 | | 12/2009 | Kolax et al. |
| 2014/0224932 | A1 | * | 8/2014 | Cardin ........................ 244/119 |

FOREIGN PATENT DOCUMENTS

| | | |
|---|---|---|
| CN | 101631719 A | 1/2010 |
| CN | 201944077 U | 8/2011 |

\* cited by examiner

*Primary Examiner* — David Bryant
*Assistant Examiner* — Lee A Holly
(74) *Attorney, Agent, or Firm* — Quinn Law Group, PLLC

(57) ABSTRACT

A method of isolating a metallic fastener from a carbon-fiber composite panel includes inserting the metallic fastener within an electrically isolating annular collar; inserting the metallic fastener and electrically isolating annular collar within a hole defined by the carbon-fiber composite panel; and securing the metallic fastener to the carbon-fiber composite panel. The annular collar may be circumferentially disposed about the metallic fastener such that the annular collar separates and electrically isolates the entire metallic fastener from the carbon-fiber composite panel. As such, the annular collar may minimize the galvanic reaction between the fastener and the carbon-fiber composite panel.

12 Claims, 1 Drawing Sheet

METHOD OF ISOLATING METALLIC FASTENERS IN COMPOSITE PANELS

TECHNICAL FIELD

The present invention relates generally to preventing galvanic reactions between metallic fasteners and carbon fiber composite panels.

BACKGROUND

Carbon-fiber composites are known to be particularly strong, yet light-weight materials that can be molded into highly customizable shapes. These properties are highly desirable to the automotive and aircraft industries in their ever increasing goal to reduce weight and maximize fuel efficiency while providing a highly stylized product. In practice, carbon-fiber panels have proven difficult to integrate into a vehicle due to carbon's high electropotential relative to most fasteners (typically made from aluminum or iron). In this manner, if exposed to an electrolytic solution, the carbon fibers in the composite may form a galvanic couple with the fastener, resulting in eventual corrosion and/or failure of the fastener.

SUMMARY

A method of isolating a metallic fastener from a carbon-fiber composite panel includes inserting the metallic fastener within an electrically isolating annular collar; inserting the metallic fastener and electrically isolating annular collar within a hole defined by the carbon-fiber composite panel; and securing the metallic fastener to the carbon-fiber composite panel.

As assembled, the annular collar may be circumferentially disposed about the metallic fastener such that the annular collar separates and electrically isolates the entire metallic fastener from the carbon-fiber composite panel. As such, the annular collar may minimize the galvanic reaction between the fastener and the carbon-fiber composite panel. The electrically isolating annular collar may be formed from a material having electrically isolating properties, and may include, for example a nylon material, a polyvinyl chloride (PVC) material, or a Polytetrafluoroethylene (PTFE) material.

When inserted, a portion of the metallic fastener and electrically isolating annular collar may pass through the hole such that the portion protrudes from the carbon-fiber composite panel. Securing the fastener in place may include, for example, deforming the protruding portion of metallic fastener such that the protruding portion of metallic fastener is restrained from passing back into the hole. In one configuration, the metallic fastener may be a rivet The method may be used to secure the carbon-fiber composite panel to a second composite panel, wherein the electrically isolating annular collar separates and electrically isolates the metallic fastener from the second carbon-fiber composite panel.

Likewise, an assembly according to the present method includes a first carbon-fiber composite panel, a second carbon-fiber composite panel, an electrically isolating annular collar, and a metallic fastener. The second carbon-fiber composite panel is positioned to abut the first carbon-fiber composite panel, and the first and second carbon-fiber composite panels defining a common hole. The electrically isolating annular collar is disposed within the hole and defines a central bore. The metallic fastener disposed within the central bore such that the electrically isolating annular collar is circumferentially disposed about the metallic fastener. The metallic fastener includes: a head portion disposed adjacent to the first carbon-fiber composite panel; a deformable end portion disposed adjacent to the second carbon-fiber composite panel; and a body portion disposed within the hole.

The above features and advantages and other features and advantages of the present invention are readily apparent from the following detailed description of the best modes for carrying out the invention when taken in connection with the accompanying drawings.

DETAILED DESCRIPTION

Figure 1:
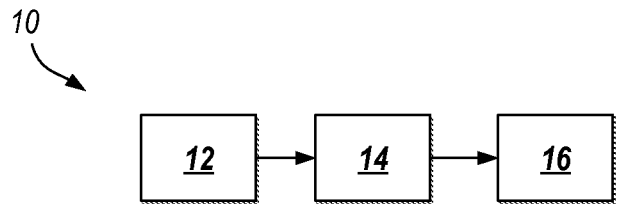
FIG. 1 is a flow diagram of a method of isolating a metallic fastener from a carbon-fiber composite panel.

Referring to the drawings, wherein like reference numerals are used to identify like or identical components in the various views, FIG. 1 schematically illustrates a method 10 of isolating a metallic fastener 20 from a carbon-fiber composite panel 22 such that the galvanic reaction between the fastener 20 and the carbon-fiber composite panel 22 is minimized. The method 10 may include the steps of: inserting the metallic fastener 20 within an electrically isolating annular collar 24 such that the collar 24 is circumferentially disposed about the fastener 20 (step 12); inserting the metallic fastener 20 and electrically isolating annular collar 24 within a hole 26 defined by the composite panel 22 (step 14); and securing the fastener 20 to the composite panel 22 such that the annular collar 24 separates and electrically isolates the entire metallic fastener 20 from the composite panel 22 (step 16).

Figure 2:
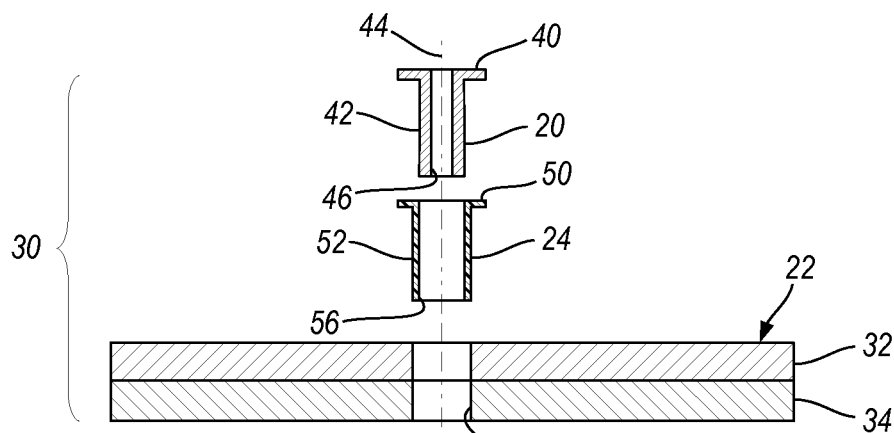
FIG. 2 is a schematic exploded cross-sectional view of a metallic fastener, electrically isolating annular collar, and a carbon-fiber composite panel.
Figure 3:
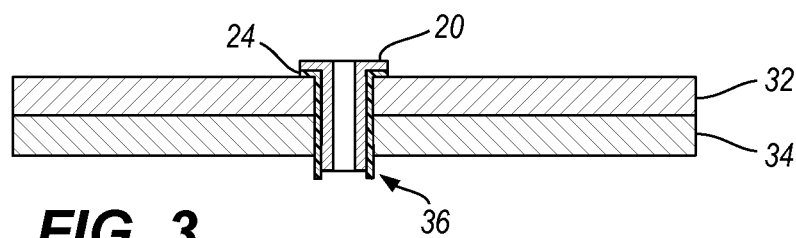
FIG. 3 is a schematic cross-sectional view of the metallic fastener and electrically isolating annular collar of FIG. 2, inserted into the carbon-fiber composite panel.
Figure 4:
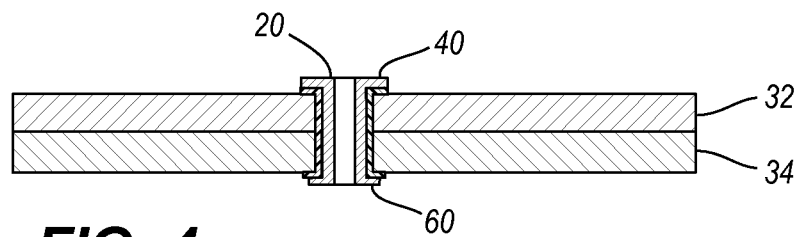
FIG. 4 is a schematic cross-sectional view of the metallic fastener and electrically isolating annular collar of FIG. 3, secured to the carbon-fiber composite panel.

The above described method 10 is schematically illustrated in the sequence of cross-sectional illustrations provided in FIGS. 2-4. For example, FIG. 2 generally illustrates an exploded view 30 of a metallic fastener 20, an electrically isolating annular collar 24, and a first and second composite panel 32, 34 that define a common hole 26. While these figures illustrate the metallic fastener 20 as a rivet, other fasteners may similarly be used, such as for example, a nut/bolt. The fastener 20 may be used, for example, to secure the first composite panel 32 to the second composite panel 34, as shown, however, it may equally be used to secure a composite panel 22 to a second material, such as a vehicle frame member.

FIG. 3 generally illustrates the fastener 20 and annular collar 24 following the insertion of the fastener and collar into the hole 26. The fastener 20 and collar 24 may each have a respective length that is greater than the transverse width of the panel they are intended to secure. In this manner, once inserted through the hole 26, a portion 36 of the fastener 20 and collar 24 may extend through and/or protrude from the second composite panel 34 such that the portion is proud of the panel.

As generally illustrated in FIG. 2, the fastener 20 may generally comprise a head portion 40 and a body portion 42 that may each be disposed about a longitudinal axis 44. The head portion 40 may be relatively wider than the body portion 40 such that the head portion 40 may be incapable of passing through the hole 26. In the case of a rivet, the fastener 20 may also define a central bore 46 that extends through the length of the fastener 20 along the longitudinal axis 44.

Similar to the fastener 20, the annular collar 24 may generally comprise a head portion 50 and a body portion 52 that may each be disposed about the longitudinal axis 44. The head portion 50 may be relatively wider than the body portion 52 such that the head portion 50 may be incapable of passing through the hole 26. The head portion 50 of the annular collar 24 may be dimensioned according to the size of the head portion 40 of the fastener 20, where the annular collar 24 may be disposed between the entire head portion 40 of the fastener 20 and the composite panel 32. The annular collar 24 may also define a central bore 56 that extends through the length of the collar 24 along the longitudinal axis 44 and is dimensioned to accept the body portion 42 of the fastener 20. When installed, but prior to being fastened, the body portion 52 of the annular collar 24 may extend beyond the body portion 42 of the fastener 20, as shown in FIG. 3. In this manner, when the fastener is deformed, it may be assured that the annular collar entirely separates the fastener 20 from the composite panel.

FIG. 4 generally illustrates the fastener 20 once it has been secured to the composite panels 32, 34. In the embodiment shown, a portion 60 of the fastener 20 that is proud of the second composite panel 34 may be deformed radially outward to secure the fastener 20 in place. Once secured, the fastener 20 is restrained from being removed from the hole 26 by each of the respective head portion 40 and the deformed portion 60. As the fastener is deformed, it may urge the electrically isolating annular collar 24 to deform in a similar manner such that the annular collar 24 is disposed between the entire deformed portion 60 and the second composite panel 34. In a configuration where the fastener is a bolt that is secured by a nut, the electrically isolating annular collar 24 may be similarly deformable by the nut to electrically isolate the nut from the composite panel 34. The head portion 50 of the annular collar 24 may be opposite the deformed portion 60 and may be disposed between the head portion 40 of the fastener 20 and the first composite panel 32.

The electrically isolating annular collar 24 may be formed from a material that does not readily conduct electricity, and may be operable to prevent current flow between the fastener 20 and the carbon fibers contained within the composite panels 32, 34. For example, the annular collar 24 may be made from a nylon material, a polyvinyl chloride (PVC) material, or a Polytetrafluoroethylene (PTFE) material. As generally illustrated in FIG. 4, the annular collar 24 may entirely shield the metallic fastener 20 from contact with the composite panels 32, 34. In doing so, and by not leaving any voids, the annular collar 24 may also prevent an electrolytic solution from flowing into the intermediate space and promoting a galvanic reaction between the fastener and the composite.

It is contemplated that other methods of electrically isolating the fastener 20 may likewise be used to prevent a galvanic reaction, such as anodizing or hot-dipping the fastener 20 with an electrically insulating coating. The present method using a slip-on annular collar, however, may provide similar results, though at a substantially reduced cost. Additionally, with the slip-on collar 24, there is a reduced risk that the electrical insulation would be damaged during the securing step, as may occur with a hot-dip coating. Instead, the slip-on annular collar 24 may merely roll out of the way as the fastener is being deformed.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of isolating a metallic fastener from a carbon-fiber composite panel such that a galvanic reaction between the fastener and the carbon-fiber composite panel is minimized, wherein the metallic fastener includes a body portion, the method comprising:
    inserting the metallic fastener within an electrically isolating annular collar such that the electrically isolating annular collar is circumferentially disposed about the metallic fastener,
    wherein a portion of the annular collar extends beyond the body portion of the metallic fastener and wherein the metallic fastener defines a central bore extending completely through the metallic fastener;
    inserting the metallic fastener and electrically isolating annular collar within a hole defined by the carbon-fiber composite panel such that a portion of the metallic fastener and the portion of the annular collar extending beyond the body portion of the metallic fastener are protruding from the panel; and
    securing the metallic fastener to the carbon-fiber composite panel such that the annular collar separates and electrically isolates the entire metallic fastener from the carbon-fiber composite panel;
    wherein the central bore extending completely through the metallic fastener remains open after the securing.

2. The method of claim 1, wherein the metallic fastener secures the composite panel to a second composite panel; and
    wherein the electrically isolating annular collar separates and electrically isolates the metallic fastener from the second carbon-fiber composite panel.

3. The method of claim 1, wherein the electrically isolating annular collar includes a nylon material, a polyvinyl chloride (PVC) material, or a Polytetrafluoroethylene (PTFE) material.

4. The method of claim 1, wherein the metallic fastener is a rivet.

5. The method of claim 4, wherein securing the metallic fastener to the carbon-fiber composite panel includes radially outwardly deforming the portion of the metallic fastener that is protruding from the carbon-fiber composite panel.

6. The method of claim 1, wherein securing the metallic fastener to the carbon-fiber composite panel includes radially outwardly deforming the portion of the metallic fastener that is protruding from the carbon-fiber composite panel.

7. A method of isolating a metallic fastener from a carbon-fiber composite panel such that the galvanic reaction between the fastener and the carbon-fiber composite panel is minimized, wherein the metallic fastener includes a body portion, the method comprising:
    inserting the metallic fastener within an electrically isolating annular collar such that the electrically isolating annular collar is circumferentially disposed about the metallic fastener,
    wherein a portion of the annular collar extends beyond the body portion of the metallic fastener and wherein the metallic fastener defines a central bore extending completely through the metallic fastener;
    inserting the metallic fastener and electrically isolating annular collar within a hole defined by the carbon-fiber composite panel such that a portion of the metallic fastener and the portion of the annular collar extending beyond the body portion of the metallic fastener are protruding from the panel; and, securing the protruding portion of the metallic fastener such that the protruding portion of metallic fastener is restrained from passing into the hole;

wherein the annular collar separates and electrically isolates the entire metallic fastener from the carbon-fiber composite panel; and, wherein the central bore extending completely through the metallic fastener remains open after the securing.

8. The method of claim 7, wherein the metallic fastener secures the composite panel to a second composite panel; and wherein the electrically isolating annular collar separates and electrically isolates the metallic fastener from the second carbon-fiber composite panel.

9. The method of claim 7, wherein the electrically isolating annular collar includes a nylon material, a polyvinyl chloride (PVC) material, or a Polytetrafluoroethylene (PTFE) material.

10. The method of claim 7, wherein the metallic fastener is a rivet.

11. The method of claim 10, wherein securing the metallic fastener to the carbon-fiber composite panel includes radially outwardly deforming the portion of the metallic fastener.

12. The method of claim 7, wherein securing the metallic fastener to the carbon-fiber composite panel includes radially outwardly deforming the portion of the metallic fastener that is protruding from the carbon-fiber composite panel.

* * * * *